(12) United States Patent
Qian et al.

(10) Patent No.: US 11,333,742 B2
(45) Date of Patent: May 17, 2022

(54) LASER RANGE FINDER FOR TWO-COLOR SWITCHING DISPLAY

(71) Applicant: JINHUA LANHAI PHOTOELECTRICITY TECHNOLOGY CO., LTD., Jinhua (CN)

(72) Inventors: Xiangwei Qian, Jinhua (CN); Chongqiu Liu, Jinhua (CN); Yiqun Fan, Jinhua (CN)

( * ) Notice: Subject to any disclaimer, the term of this patent is extended or adjusted under 35 U.S.C. 154(b) by 387 days.

(21) Appl. No.: 16/737,930

(22) Filed: Jan. 9, 2020

(65) Prior Publication Data

US 2020/0150227 A1    May 14, 2020

(51) Int. Cl.
| | |
|---|---|
| *G01C 3/08* | (2006.01) |
| *G01S 7/481* | (2006.01) |
| *G02B 5/04* | (2006.01) |
| *G02B 27/12* | (2006.01) |
| *G02B 27/01* | (2006.01) |
| *G02B 23/04* | (2006.01) |
| *G02B 25/00* | (2006.01) |

(52) U.S. Cl.
CPC ............... *G01S 7/481* (2013.01); *G02B 5/04* (2013.01); *G02B 23/04* (2013.01); *G02B 25/001* (2013.01); *G02B 27/0101* (2013.01); *G02B 27/126* (2013.01); *G02B 2027/0141* (2013.01)

(58) Field of Classification Search
CPC ........ G02B 5/04; G02B 23/04; G02B 25/001; G02B 27/0101; G02B 27/126; G02B 2027/0141; G01S 7/481
USPC .......................................................... 356/4.01
See application file for complete search history.

(56) References Cited

FOREIGN PATENT DOCUMENTS

WO    WO-2018192068 A1 * 10/2018    ............. G01S 17/08

\* cited by examiner

*Primary Examiner* — William Choi

(57) ABSTRACT

The present invention discloses a laser range finder for two-color switching display, comprising a monocular telescope, a laser light emitting system, a laser receiver and an OLED liquid crystal display (LCD) imaging system, wherein the monocular telescope comprises an objective lens, a roof half penta prism, a cemented prism, an eyepiece and an LCD unit; laser light emitted by the laser light emitting system is emitted onto an object to be measured, and the reflected back laser light is received by the laser receiver after passing through the objective lens, the roof half penta prism and the cemented prism; and light emitted by the OLED LCD imaging system is imaged on the focal plane of the eyepiece through the cemented prism. The present invention can achieve two-color display of the laser range finder, meeting the requirements for use in a variety of conditions.

11 Claims, 6 Drawing Sheets

LASER RANGE FINDER FOR TWO-COLOR SWITCHING DISPLAY

TECHNICAL FIELD

The present invention belongs to the technical field of laser range finders, and more particularly relates to a laser range finder for two-color switching display.

BACKGROUND

Laser range finders mainly include pulse-type laser range finders, phase-type laser range finders and triangulation laser range finders. A telescope laser range finder is most common among pulse-type laser range finders, comprising a telescope and a laser transceiving module, mainly used for laser ranging of intermediate and long distance. The process of pulse-type laser ranging is: laser light emitted by the range finder is reflected by the object to be measured and then received by the range finder, the range finder simultaneously records the round-trip time of the laser light, half of the product of the speed of light and the round-trip time is the distance between the range finder and the object to be measured, and then this distance information is displayed on the focal plane of the eyepiece and is received and read by an observer.

In actual use, telescope range finder products are used in a variety of environments, for example, sunny daytime or sunset dusk. However, at present, the current display of a telescope range finder on the market generally uses an ordinary transmissive LCD unit that displays a black font, the contrast ratio of the displayed font is related to the luminous flux entering the range finder, the higher the luminous flux, the higher the contrast ratio of the displayed font, and the lower the luminous flux, the lower the contrast ratio of the displayed font. For the dark environment, it is basically impossible to display, which has a great limitation to the application requirements of various environments.

Therefore, the problem to be urgently solved by those skilled in the art is how to provide a laser range finder for two-color switching display.

SUMMARY

In view of this, the present invention provides a laser range finder for two-color switching display, which can achieve two-color display of the laser range finder. A liquid crystal display (LCD) is used in a scenario of bright environment and an OLED LCD is used in a scenario of dim environment, meeting the requirements for use in a variety of conditions.

To achieve the above purpose, the present invention adopts the following technical solution:

A laser range finder for two-color switching display, comprising a monocular telescope, a laser light emitting, system, a laser receiver and an OLED LCD imaging system, wherein the monocular telescope comprises an objective lens, a roof half penta prism, a cemented prism, an eyepiece and an LCD unit arranged at the focal plane of the eyepiece; laser light emitted by the laser light emitting system is emitted onto an object to be measured, and the reflected back laser light is received by the laser receiver after passing through the objective lens, the roof half penta prism and the cemented prism; and light emitted by the OLED LCD imaging system is imaged on the focal plane of the eyepiece through the cemented prism.

Further, the laser light emitting system comprises a laser light emitting diode and an emitting lens, wherein the emitting lens is arranged on an emitted light path of the laser light emitting diode.

Further, the OLED LCD imaging system includes an OLED LCD imaging unit and a display lens group, wherein the display lens group is arranged between, the OLED LCD imaging unit and the cemented prism.

Further, the roof half penta prism is provided with a roof transceiving surface, a roof outer reflecting surface, a roof inner reflecting surface and a roof top surface, wherein both ends of the roof transceiving surface are intersected with one end of the roof outer reflecting surface and one end of the roof inner reflecting surface respectively, and both ends of the roof top surface are intersected the other end of the roof outer reflecting surface and the other end of the roof inner reflecting surface respectively.

Further, the cemented prism is formed by cementing an isosceles prism and a compensation prism, and the cemented surface is plated with a beam splitting film that reflects visible light and transmits OLED LCD light and laser light.

Further, the isosceles prism is provided with an isosceles input surface, an isosceles reflection and output surface, and an isosceles beam splitting surface, wherein both the isosceles reflection and output surface and the isosceles beam splitting surface are intersected with the isosceles input surface, and the isosceles input surface is close to the roof outer reflecting surface and is arranged in parallel with the roof outer reflecting surface.

Further, the compensation prism is provided with a compensation beam splitting surface, a compensation reflection and output surface, and a compensation transceiving surface, wherein some end of the compensation beam splitting surface is intersected with one end of the compensation reflection and output surface, and the other end of the compensation beam splitting surface and the other end of the compensation reflection and output surface are intersected with the compensation transceiving surface respectively; and the compensation beam splitting surface is cemented with the isosceles beam splitting surface.

Further, the isosceles input surface is parallel with the compensation reflection and output surface, and the isosceles reflection and output surface is parallel with the compensation transceiving surface.

Further, the LCD unit uses a transmissive black font for display, and the OLED LCD unit is a light-emitting LCD unit that displays a monochrome font including a red font or a green font, or displays a two-color font.

Further, the LCD unit is replaced by a clear diaphragm.

Further, the laser light emitting diode and the laser receiver are interchanged in position.

The present invention has the following advantageous effects:

In the present invention, a cemented prism formed by an isosceles prism and a compensation prism is used in combination with a roof half penta prism to form a beam splitting prism group of a telescope, one side of the compensation prism is provided with an OLED LCD imaging unit for imaging display, red, green or yellow font may be imaged on the focal plane of the eyepiece, achieving the two-color display of the laser range finder. An LCD is used in a scenario of bright environment and an OLED LCD is used in a scenario of dim environment, meeting the requirements for use in a variety of conditions. Moreover, the whole light path is reasonable in structure design, and the clever prism combination makes the range finder more compact and lighter.

BRIEF DESCRIPTION OF THE DRAWINGS

To more clearly describe the technical solution in the embodiments of the present invention or in the prior art, the, drawings required to be used in the description of the embodiments or the prior art will be simply presented below. Apparently, the drawings in the following description are merely the embodiments of the present invention, and for those ordinary skilled in the art, other drawings can also be obtained according to the provided drawings without contributing creative labor.

IN THE FIGURES

1—objective lens; 2—roof half penta prism; 210—roof transceiving surface; 211—roof inner reflecting surface; 212—roof outer reflecting surface; 213—roof top surface; 3—cemented prism; 31—isosceles prism; 310—isosceles input surface; 311—isosceles reflection and output surface; 312—isosceles beam splitting surface; 32—compensation prism; 320—compensation transceiving surface; 321—compensation reflection and output surface; 322—compensation beam splitting surface; 4—LCD unit; 5—eyepiece; 6—emitting lens; 7—laser light emitting diode; 8—OLED LCD imaging unit; 9—display lens group; 10—laser receiver, 41—clear diaphragm.

DETAILED DESCRIPTION

The technical solution in the embodiments of the present invention will be clearly and fully described below in combination with the drawings in, the embodiments of the present invention. Apparently, the described embodiments are merely part of the embodiments of the present invention, not all of the embodiments. Based on the embodiments in the present invention, all other embodiments obtained by those ordinary skilled in the art without contributing creative labor will belong to the protection scope of the present invention.

Figure 1:
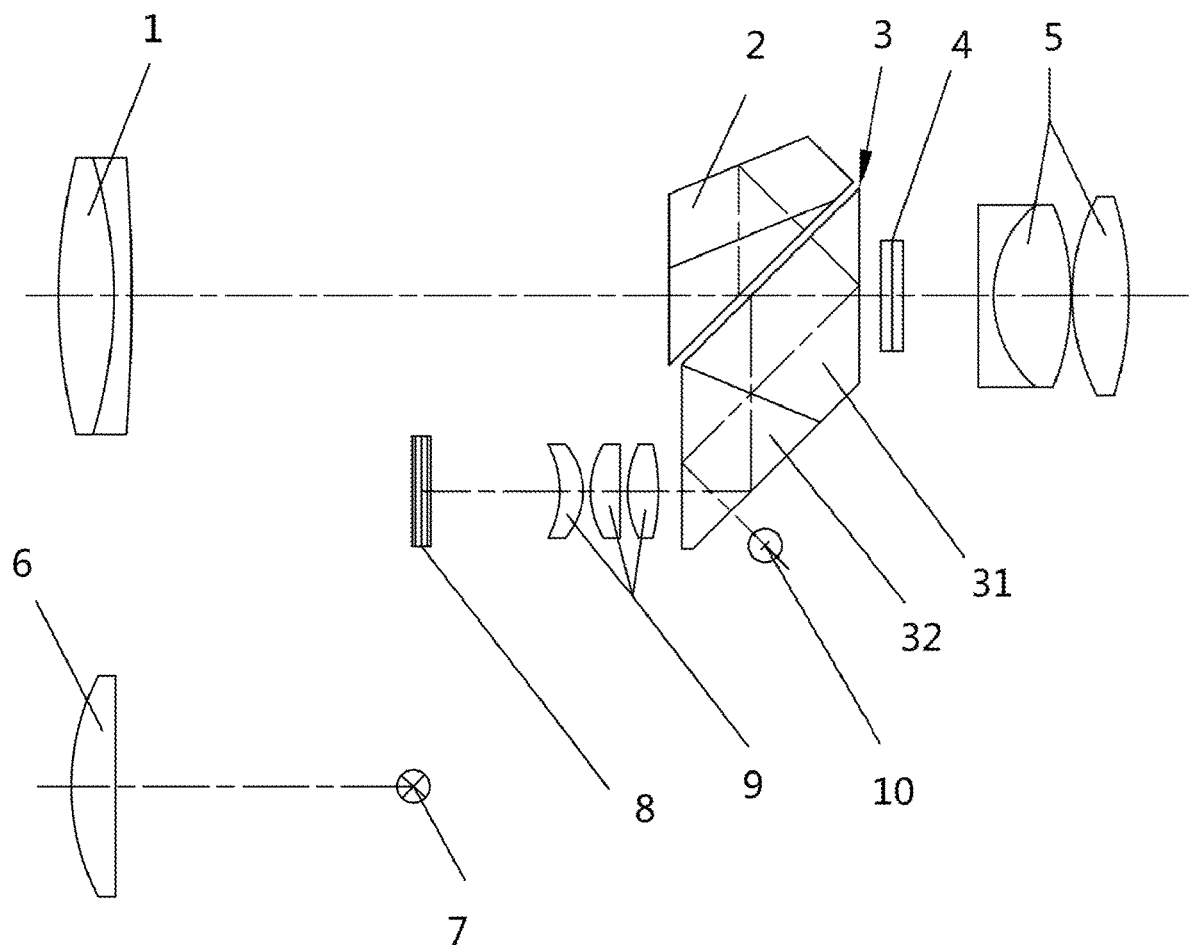
FIG. 1 is a structural schematic diagram of the present invention.

Referring to FIG. 1, the present invention provides a laser range finder for two-color switching display, comprising a monocular telescope, a laser light emitting system, a laser receiver 10 and an OLED LCD imaging system, wherein the monocular telescope comprises an objective lens 1, a roof half penta prism 2, a cemented prism 3, an eyepiece 5, and an LCD unit 4 arranged at the focal plane of the eyepiece 5, the roof half penta prism 2 and the cemented prism 3 forming a beam splitting prism group; laser light emitted by the laser light emitting system is emitted onto an object to be measured, and the reflected back laser light is received by the laser receiver 10 after passing through the objective lens 1, the roof half penta prism 2 and the cemented prism 3; and light emitted by the OLED LCD imaging system is imaged on the focal plane of the eyepiece 5 through the cemented prism 3, and the displayed information is received by a human eye through the eyepiece 5.

In another embodiment, the laser light emitting system comprises a laser light emitting diode 7 and an emitting lens 6, wherein the emitting lens 6 is arranged on an emitted light path of the laser light emitting diode 7.

In another embodiment, the laser light emitting diode 7 and the laser receiver 10 are interchanged in position.

In another embodiment, the OLED LCD imaging system includes an OLED LCD imaging unit 8 and a display lens group 9, wherein the display lens group 9 is arranged between the OLED LCD imaging unit 8 and the cemented prism 3, to achieve switching display with the LCD unit 4 and observation by a human eye through the eyepiece 5. The LCD unit 4 displays a transmissive black font in transmissive display mode; the OLED LCD imaging unit 8 is a light-emitting LCD unit which can display red font, green font or yellow font and other colored fonts, and can display a two-color font as well.

The ranging, process is: a monocular telescope observes the object to be measured, the laser light emitting diode 7 of the laser light emitting system emits laser light, the laser light passes through the emitting lens 6 and then is emitted out, after reaching the object to be measured, the light signal is reflected, the reflected light signal passes through the objective lens 1, the roof half penta prism 2 and the cemented prism 3 and then reaches the laser receiver 10, the distance of the object to be measured is calculated by circuit and software processing according to the signal time difference between emission of laser light and the reception of laser light, the distance information is simultaneously displayed on the LCD unit 4 and the OLED LCD imaging unit 8, the distance information of the OLED LCD imaging unit 8 is imaged at the focal plane of the eyepiece 5 through the display lens group 9 and the cemented prism 3, all the information are received by the human, eye through the eyepiece 5 finally, and a switch controls to switch the distance information of the object to be measured.

Figure 2:
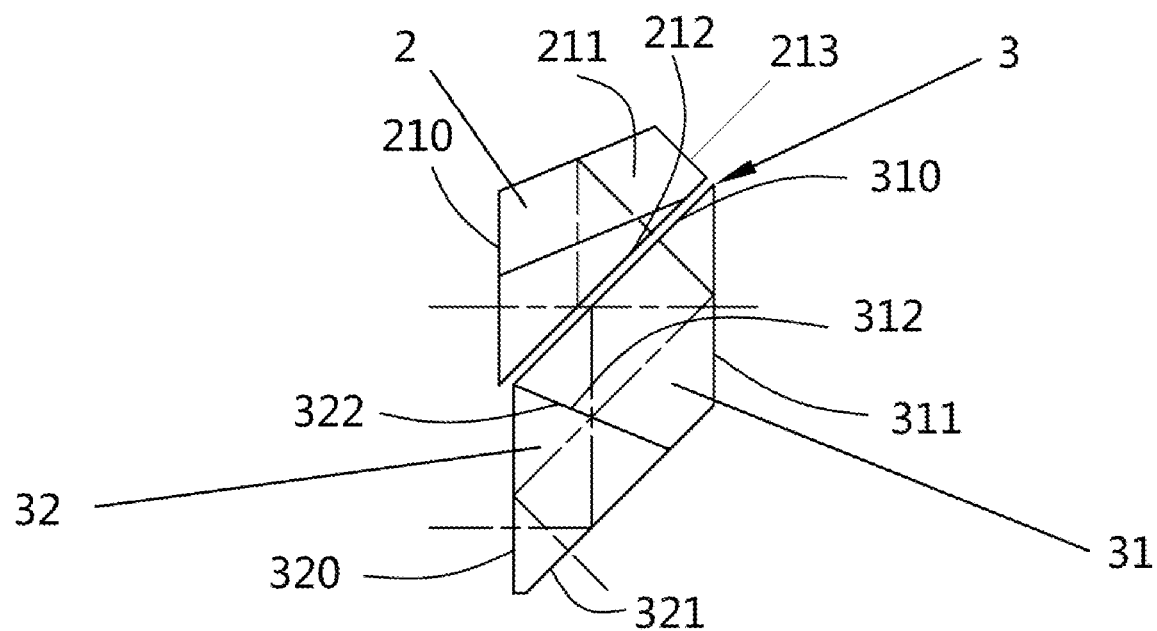
FIG. 2 is a structural schematic diagram of a beam splitting prism group of the present invention.

Referring to FIG. 2, the roof half penta prism 2 is provided with a roof transceiving surface 210, a roof outer reflecting surface 212, a roof inner reflecting surface 211 and a roof top surface 213, wherein both ends of the roof transceiving surface 210 are intersected with one end of the roof outer reflecting surface 212 and one end of the roof inner reflecting surface 211 respectively, and both ends of the roof top surface 213 are intersected the other end of the roof outer reflecting surface 212 and the other end of the roof inner reflecting surface 211 respectively.

The cemented prism 3 is formed by cementing an isosceles prism 31 and a compensation prism 32, and the cemented surface is plated with a beam splitting film that reflects visible light and transmits OLED LCD light and laser light.

The isosceles prism 31 is provided with an isosceles input surface 310, an isosceles reflection and output surface 311, and an isosceles beam splitting surface 312, wherein both the isosceles reflection and output surface 311 and the isosceles beam splitting surface 312 are intersected with the isosceles input surface 310, and the isosceles input surface 310 is close to the roof outer reflecting surface 212 and is arranged in parallel with the roof outer reflecting surface 212.

The compensation prism 32 is provided with a compensation beam splitting surface 322, a compensation reflection and output surface 321, and a compensation transceiving surface 320, wherein one end of the compensation beam splitting surface 322 is intersected with one end of the compensation reflection and output surface 321, and the other end of the compensation beam splitting surface 322 and the other end of the compensation reflection, and output surface 321 are intersected with the compensation transceiving surface 320 respectively; and the compensation beam splitting surface 322 is cemented with the isosceles beam splitting surface 312.

In another embodiment, the isosceles input surface 310 is parallel with the compensation reflection and output surface 321, and the isosceles reflection and output surface 311 is parallel with the compensation transceiving surface 320.

Figure 3:
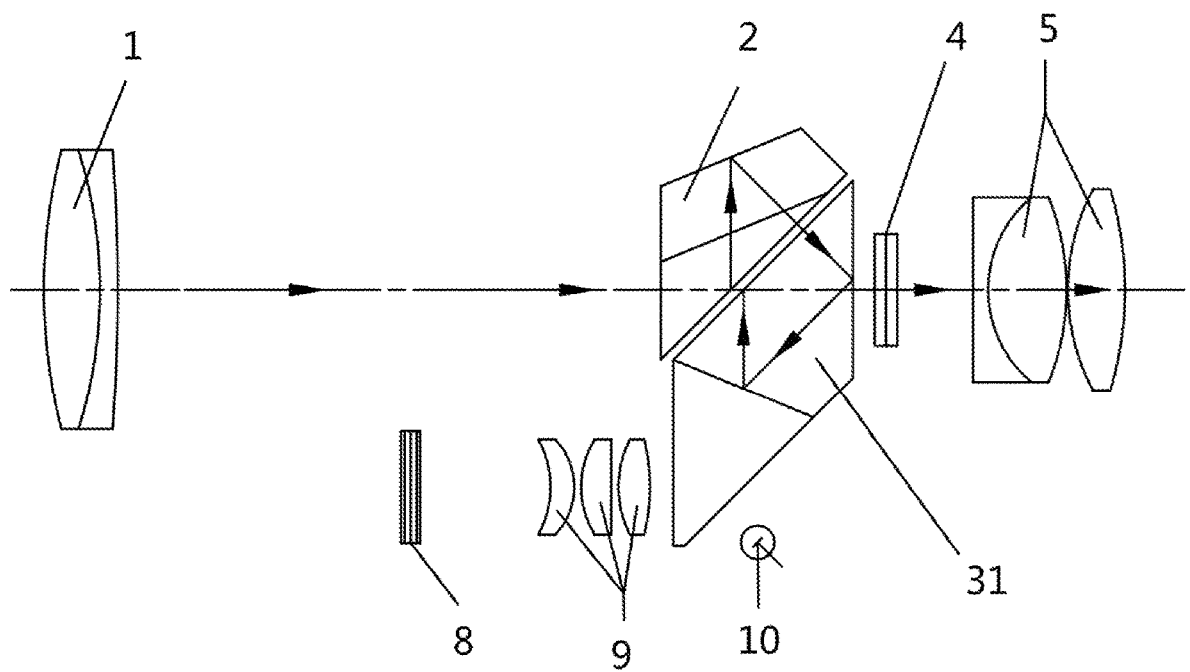
FIG. 3 is a schematic diagram of a light path of visible light of a monocular telescope of the present invention.

Referring to FIG. 3 light rays of visible light enter from the objective lens 1 and are incident from the roof transceiving surface 210 of the roof half penta prism 2, are reflected by the roof outer reflecting surface 212, the roof inner reflecting surface 211, the isosceles reflection and output surface 311, the isosceles beam splitting surface 312 and the isosceles input surface 310 in sequence and then emitted out, from the isosceles reflection and output surface 311, enter the eyepiece 5 through the LED liquid crystal display unit, and are received by the human eye finally, thereby constituting a light path system of the monocular telescope.

Figure 4:
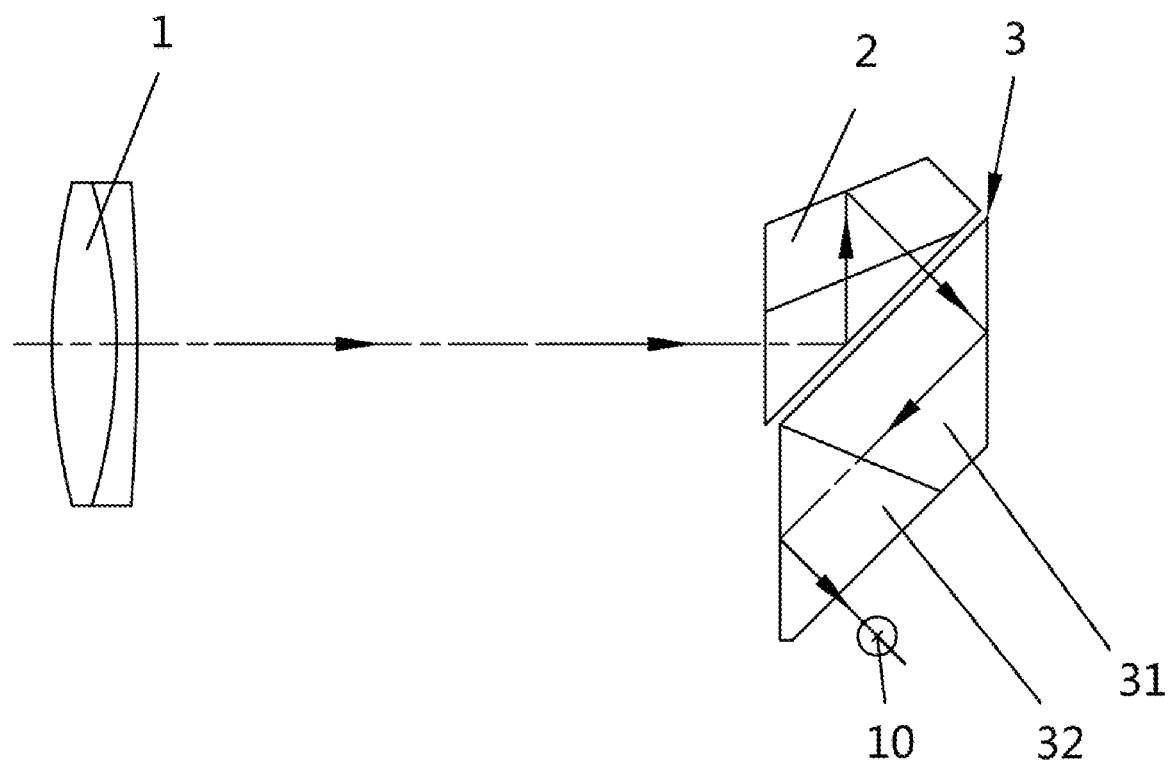
FIG. 4 is a schematic diagram of a light path of a laser receiver of the present invention.

Referring to FIG. 4, laser light emitted by the laser light emitting system is emitted onto the object to be measured, the reflected back laser light enters from the objective lens 1 and is incident from the roof transceiving surface 210 of the roof half penta prism 2, is reflected by the roof outer reflecting surface 212, the roof inner reflecting surface 211, the isosceles reflection and output surface 311 and the compensation transceiving surface 320 in sequence, is emitted out from the compensation reflection and output surface 321, and is received by the laser receiver 10.

Figure 5:
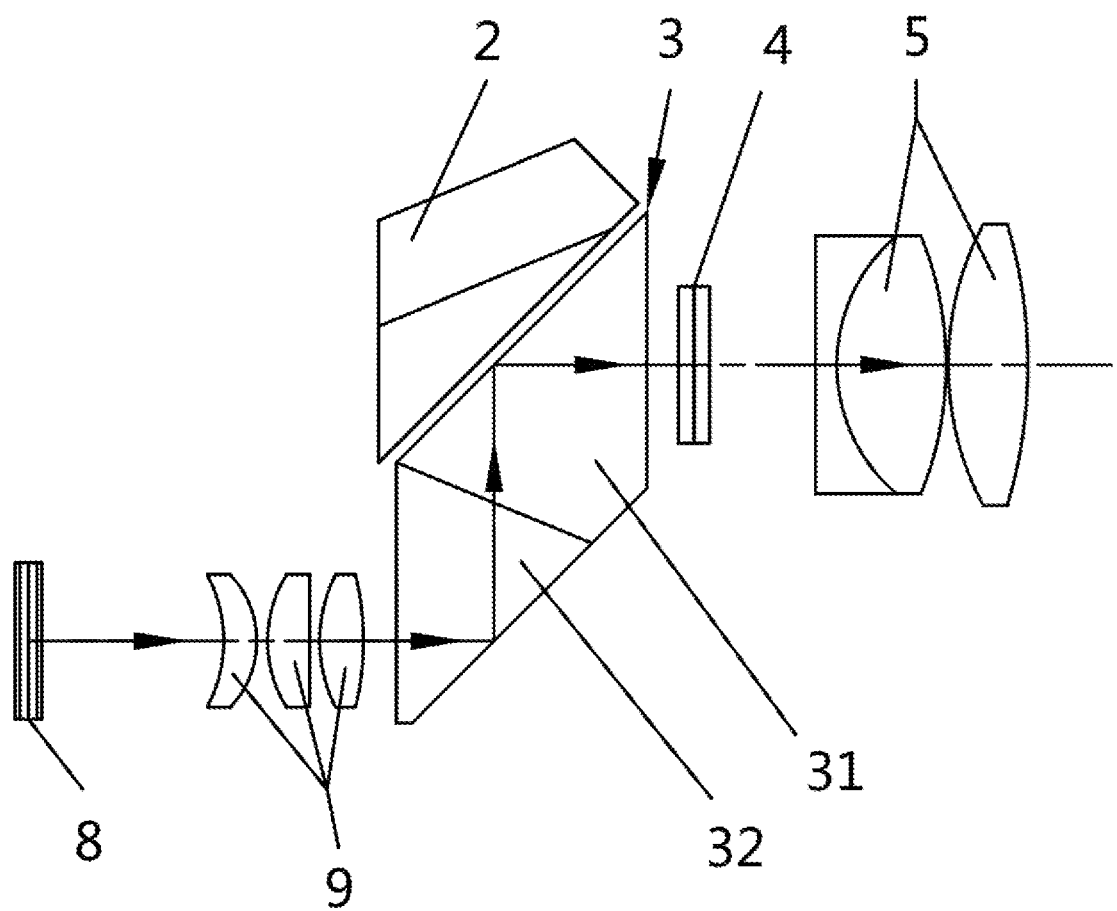
FIG. 5 is a schematic diagram of a light path of an OLED LCD imaging unit of the present invention.

Referring to FIG. 5, light emitted by the OLED LCD imaging unit 8 passes through the display lens group 9 and then is incident from the compensation transceiving surface 320, and is reflected by the compensation reflection and output surface 321 and the isosceles input surface 310 in sequence, is emitted out from the isosceles reflection and output surface 311, enters the eyepiece 5 through the LED liquid crystal display unit, and is received by the human eye finally.

Figure 6:
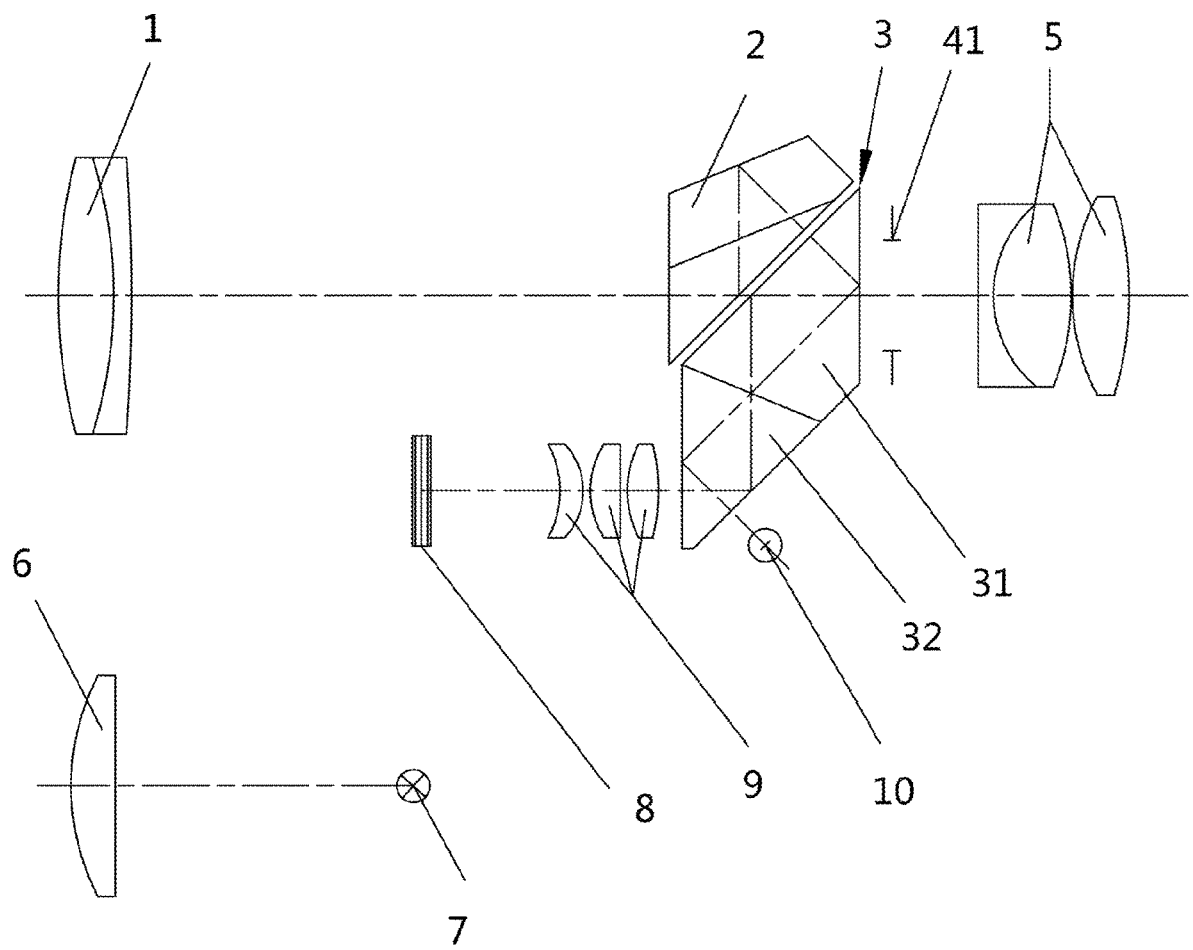
FIG. 6 is a structural schematic diagram of an LCD unit replaced by a clear diaphragm.

Referring to FIG. 6, in another embodiment, the LCD unit 4 is replaced by a clear diaphragm 41. For some use environments, if the light transmittance of the range finder needs to be increased, there is a need to cancel the transmissive LCD unit 4 and replace same with a clear diaphragm 41, the OLED LCD imaging unit 8 uses a two-color display self-luminous element to display, for example, green and red fonts, which are imaged at the clear diaphragm 41 through the display lens group 9 and the cemented prism 3 and then observed by the human eye through the eyepiece 5.

In the present invention, a cemented prism 3 formed by an isosceles prism 31 and a compensation prism 32 is used in, combination with a roof half penta prism 2 to form a beam splitting prism group of a telescope, one side of the compensation prism 32 is provided with an OLED LCD imaging unit 8 for imaging display, red, green or yellow font may be imaged on the focal plane of the eyepiece 5, achieving the two-color display of the laser range finder. An LCD is used in a scenario of bright environment and an OLED LCD is used in a scenario of dim environment, meeting the requirements for use in a variety of conditions. Moreover, the whole light path is reasonable in structure design, and the clever prism combination makes the range finder more compact and lighter.

Each embodiment in the description is described in a progressive way. The difference of each embodiment from each other is the focus of explanation. The same and similar parts among all of the embodiments can be referred to each other. For the device disclosed by the embodiments, because the device corresponds to a method disclosed by the embodiments, the device is simply described. Refer to the description of the method part for the related part.

The above description of the disclosed embodiments enables those skilled in the art to realize or use the present invention. Many modifications to these embodiments will be apparent to those skilled in the art. The general principle defined herein can be realized in other embodiments without departing from the spirit, or scope of the present invention. Therefore, the present invention will not be limited to these embodiments shown herein, but will conform to the widest scope consistent with the principle and novel features disclosed herein.

The invention claimed is:

1. A laser range finder for two-color switching display, comprising a monocular telescope, a laser light emitting system, a laser receiver and an OLED liquid crystal display (LCD) imaging system, wherein the monocular telescope comprises an objective lens, a roof half penta prism, a cemented prism, an eyepiece, and an LCD unit arranged at the focal plane of the eyepiece; laser light emitted by the laser light emitting system is emitted onto an object to be measured, and the reflected back laser light is received by the laser receiver after passing through the objective lens, the roof half penta prism and the cemented prism; and light emitted by the OLED LCD imaging system is imaged on the focal plane of the eyepiece through the cemented prism.

2. The laser range finder with dual-color switching display according to claim 1, wherein the laser light emitting system comprises a laser light emitting diode and an emitting lens, wherein the emitting lens is arranged on an emitted light path of the laser light emitting diode.

3. The laser range finder for two-color switching display according to claim 2, wherein the laser light emitting diode and the laser receiver are interchanged in position.

4. The laser range finder with dual-color switching, display according to claim 1, wherein the OLED LCD imaging system includes an OLED LCD imaging unit and a display lens group, wherein the display lens group is arranged between the OLED LCD imaging unit and the cemented prism.

5. The laser range finder with dual-color switching display according to claim 1, wherein the roof half penta prism is provided with a roof transceiving surface, a roof outer reflecting surface, a roof inner reflecting surface and a roof top surface, wherein both ends of the roof transceiving surface are intersected with one end of the roof outer reflecting surface and one end of the roof inner reflecting surface respectively, and both ends of the roof top surface are intersected with the other end of the roof outer reflecting surface and the other end of the roof inner reflecting surface respectively.

6. The laser range finder with dual-color switching display according to claim 5, wherein the cemented, prism is formed by cementing an isosceles prism and a compensation prism, and the cemented surface is plated with a beam splitting film that reflects visible light and transmits OLED LCD light and laser light.

7. The laser range finder with dual-color switching display according to claim 6, wherein the isosceles prism is provided with an isosceles input surface, an isosceles reflection and output surface, and an isosceles beam splitting surface, wherein both the isosceles reflection and output surface and the isosceles beam splitting surface are intersected with the isosceles input surface, and the isosceles input surface is close to the roof outer reflecting surface and is arranged in parallel with the roof outer reflecting surface.

8. The laser range finder with dual-color switching display according to claim 7, wherein the compensation prism is provided with a compensation beam splitting surface, a compensation reflection and output surface, and a compensation transceiving surface, wherein one end of the compensation beam splitting surface is intersected with one end of the compensation reflection and output surface, and the other end of the compensation beam splitting surface and the other end of the compensation reflection and output surface are intersected with the compensation transceiving surface respectively; and the compensation beam splitting surface is cemented with the isosceles beam splitting surface.

9. The laser range finder for two-color switching display according to claim 8, wherein the isosceles input surface is parallel with the compensation reflection and output surface, and the isosceles reflection and output surface is parallel with the compensation transceiving surface.

10. The laser range finder for two-color switching display according to claim 1, wherein the LCD unit uses a transmissive black font for display, and the OLED LCD unit is a light-emitting LCD unit that displays a monochrome font including a red font or a green font, or displays a two-color font.

11. The laser range, finder for two-color switching display according to claim 1, wherein the LCD unit is replaced by a clear diaphragm.

* * * * *